March 2, 1926.　　　　　　　　　　　　　　　　　1,575,227
M. POLJANIC
SAFETY FENDER FOR AUTOMOBILES
Filed June 2, 1925　　　2 Sheets-Sheet 1

INVENTOR
Matthew Poljanic
BY
Frank J. Hunt
ATTORNEY

March 2, 1926.  1,575,227
M. POLJANIC
SAFETY FENDER FOR AUTOMOBILES
Filed June 2, 1925  2 Sheets-Sheet 2
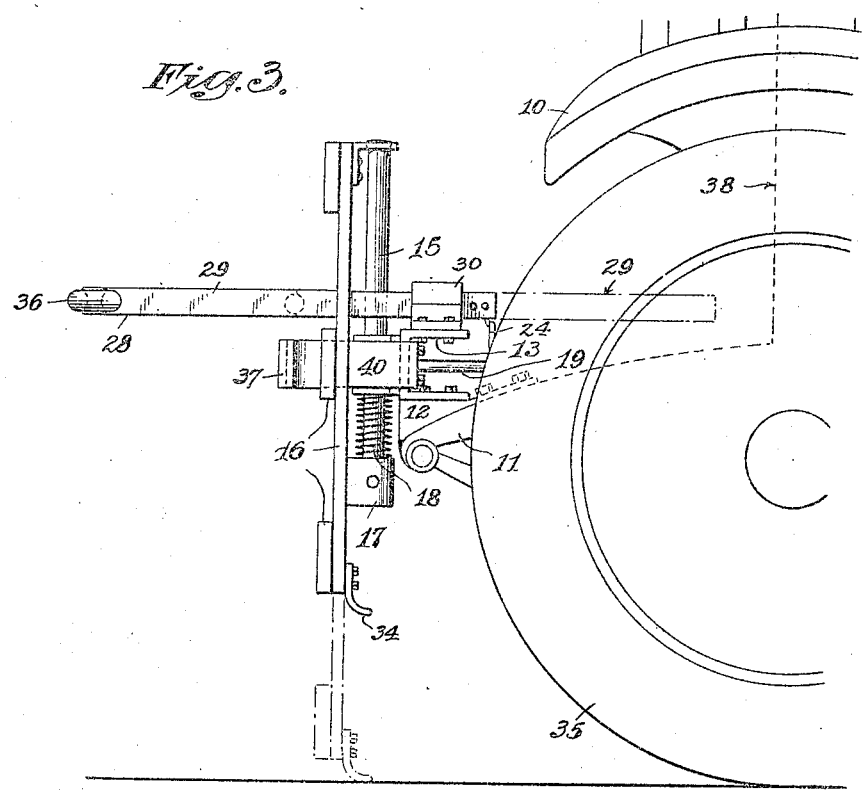
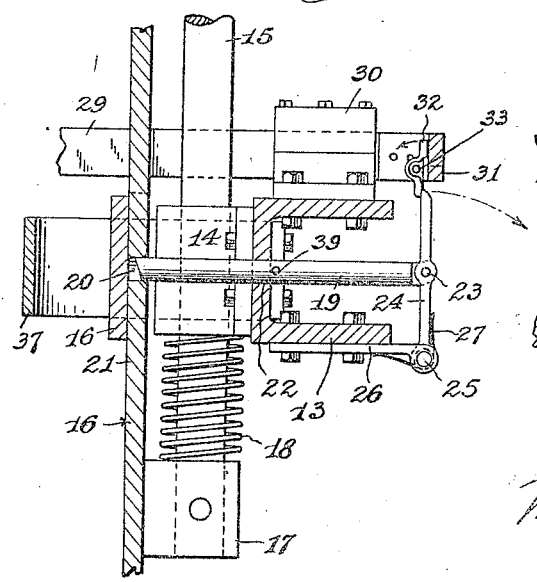
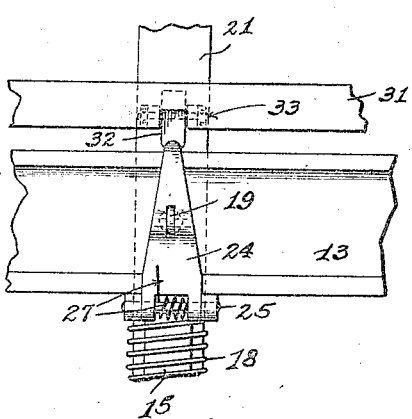
INVENTOR
Matthew Poljanic
BY
Frank J. Heut
ATTORNEY Patented Mar. 2, 1926.

1,575,227

UNITED STATES PATENT OFFICE.

MATTHEW POLJANIC, OF WEST NEW YORK, NEW JERSEY.

SAFETY FENDER FOR AUTOMOBILES.

Application filed June 2, 1925. Serial No. 34,277.

*To all whom it may concern:*

Be it known that I, MATTHEW POLJANIC, a citizen of the United States, residing at West New York, in the county of Hudson and State of New Jersey, have invented certain new and useful Improvements in Safety Fenders for Automobiles, of which the following is a specification.

This invention relates to the construction of a safety gate or fender for use with automobiles.

A general object of the invention is to provide a safety device which will automatically operate to prevent an obstacle struck by the automobile from being run over by the wheels of the vehicle.

The invention includes a vertically movable gate structure supported on the forward extremity of the vehicle and normally tending to descend to a lowered position in contact with the roadway. Latch mechanism is provided for holding the gate in raised position and a tripping bumper is arranged to release the latch mechanism and permit the descent of the gate member to protective position when the bumper strikes an object in the path of the vehicle.

Other features of the invention will be hereinafter referred to.

In the drawings in which a preferred embodiment of the invention has been selected for illustration, Figure 1 is a plan view of the forward extremity of an automobile equipped with an embodiment of the invention.

Figure 3 is a view in side elevation of the parts shown in Figures 1 and 2.

Figure 4 is a sectional view on an enlarged scale taken on the line 4—4 of Figure 2.

Figure 5 is a view in rear elevation of the parts shown in Figure 4.

Figure 1:
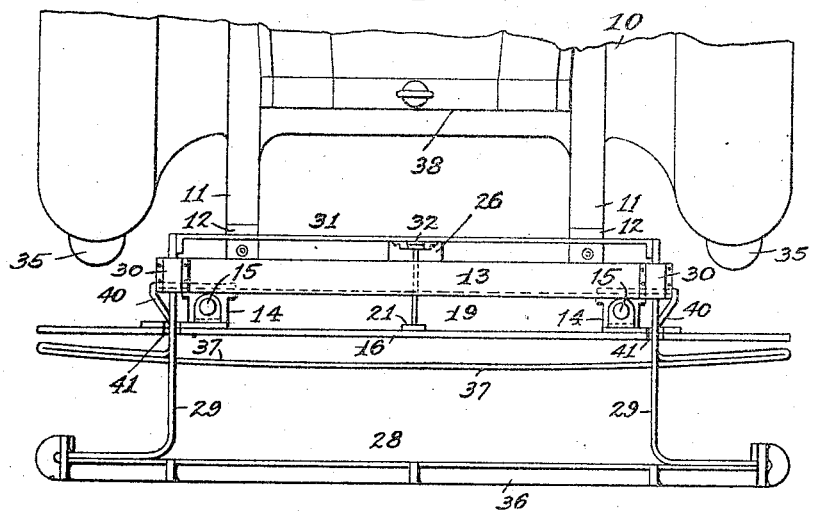
Figure 2:
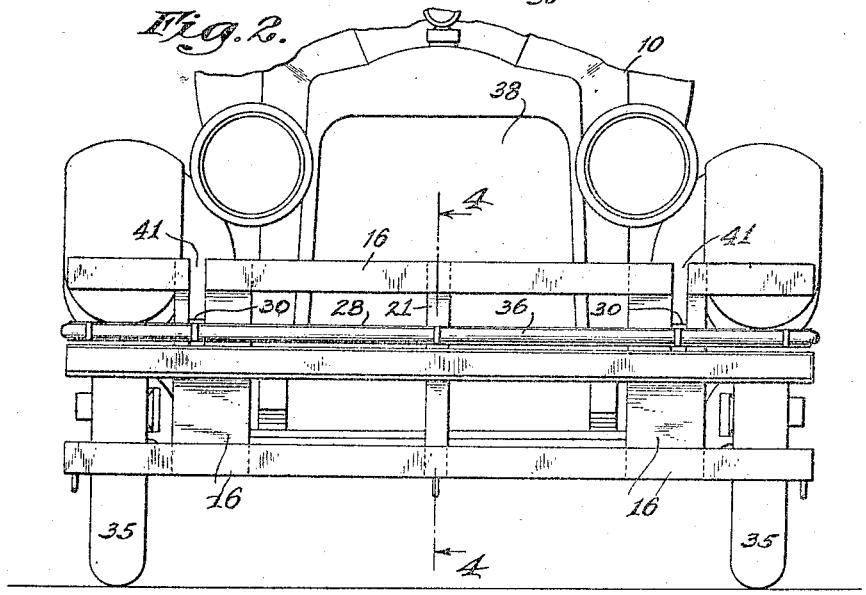
Figure 2 is a view in front elevation of the device shown in Figure 1.

Referring to the drawings for a more detailed description of the invention, in Figures 1, 2 and 3 of the drawing there is shown the forward extremity of an automobile 10 including the usual forwardly extending spring supporting bracket members 11. The spring supporting members 11 are equipped with brackets 12 which in turn support a channel frame member 13 extending transversely of the vehicle as is indicated in Figures 1 and 3 of the drawing. The channel member 13 provides a support for the safety gate mechanism comprising the invention hereinafter described.

A pair of bracket members 14 are mounted on the forward face of the transversely extending channel bar 13 and form guiding members for a pair of vertically disposed rods 15 which are adapted to have vertical movement in the brackets 14 corresponding to vertical movement of a safety gate member 16 to which the guide rods 15 are attached at their upper and lower extremities. Between the lower faces of the bracket members 14 and the blocks 17 which connect the lower ends of the rods 15 to the gate 16 are mounted a pair of expansion spring members 18 which tend to move the gate member downwardly into engagement with the roadway as is indicated in dotted lines in Figure 3 of the drawing.

In order to hold the safety gate member 16 in a normally elevated position such as is shown in full lines in Figure 3 of the drawing, a longitudinally movable trip member 19 is provided which engages at its forward end in an opening 20 formed for the purpose in the vertical frame member 21 of the gate 16. The trip member 19 is slidably mounted in an opening 22 in the channel supporting member 13 and at its rearward end is pivotally connected at 23 with a latch arm 24 having a hinged connection at 25 with a plate 26 bolted to the lower frame member of the channel bar 13. A spring 27 engages the outer face of the trip arm 24 and tends to hold the arm in vertical position such as will cause the trip member 19 to be extended forwardly into holding position with relation to the gate as is shown in Figure 4 of the drawing.

In order to trip the member 19, that is, to withdraw it from its engagement in the opening 20 of the gate 16, a tripping bumper 28 is provided which includes a pair of rearwardly extending arms 29 passing through guiding bracket members 30 on the channel supporting bar 13 and connected at their rearward extremities by a transverse bar 31 which carries a latch member 32 pivotally connected at 33 to the forward face of the bar 31.

The construction described is such that the engagement of an object with the tripping bumper 28 results in the rearward movement of the bumper with relation to the supporting parts so that the transverse bar 31 and the latch 32 are moved rearwardly thereby swinging the tripping arm 24 in a clockwise direction and withdrawing the trip member 19 from engagement with the gate 16. The springs 18 thereupon act to force the gate to its lowered position in which the ground engaging shoes 34 make contact with the surface of the roadway and the gate prevents the pedestrian collided with from falling beneath the wheels 35 of the vehicle.

In order to enhance the cushioning or shock absorbing action of the tripping bumper when engaging an obstacle, a hollow tubular member 36 formed of rubber or the like is mounted on the forward face of the tripping bumper 28 as indicated in Figures 1, 2 and 3 of the drawing. It will also be seen that in the rearward movement of the tripping bumper as a whole a point is reached in which the regular bumper structure 37 comes into play and in its turn engages the struck object. Meanwhile the tripping bumper mechanism has been pushed rearwardly to a position in which the rear transverse bar 31 is immediately adjacent to but not in contact with the forward face of the radiator 38.

In order to place the tripping bumper mechanism in an inoperative position when the vehicle is operating under dense traffic conditions, the tripping bumper as a whole may be pushed rearwardly to a position in which the regular bumper 37 occupies the forward position. In order to hold the gate in its elevated position under the inoperative condition described, the trip arm 24 is swung to its raised position and the tripping member 19 moved into engagement with the opening 20 in the gate 16. This arrangement of the mechanism will permit the gate to remain in its elevated position as will be seen. When it is again desired to bring the tripping bumper mechanism into operative position it is necessary merely to draw the tripping bumper parts forwardly whereupon the pivoted latch member 32 will ride across the upper end of the trip arm 24 and take the position shown in Figure 4 in readiness to engage and force the trip arm rearwardly when the tripping bumper 28 strikes an object as has been described.

It will be seen that the gate can be restored to its normal elevated position after an operation by the mere lifting thereof to the desired elevation when the trip member 19 will snap into engagement with the opening 20 in the gate structure. A stop pin 39 in the tripping rod 19 prevents excessive forward movement of the member 19 by engagement of the pin with the rear face of the channel bar 13.

In order to provide for vertical movement of the gate 16 with relation to the rearwardly extending arms 29 of the tripping bumper and the bracket arms 40 of the regular bumper 37, vertical slots 41 are provided in the upper part of the gate structure in which the members referred to are received in the upward movement of the gate as will be clear.

I claim:—

1. In a safety fender construction for automobiles, a support bar adapted to be mounted in a position extending transversely across the forward extremity of the vehicle, a vertically movable safety gate structure, vertically disposed guide rods carried by the gate structure, bracket members mounted on the support bar in which the guide rods are supported for vertical movement, latch means for normally holding the gate structure in an elevated position, and means including a bumper for tripping the latching means to permit the gate structure to drop to protective position.

2. In a safety fender construction for automobiles, a support bar extending transversely across the forward extremity of the vehicle, a vertically movable safety gate structure, vertically disposed guide rods carried by the gate structure, bracket members mounted on the support bar in which the guide rods are supported for vertical movement, a latch member extending through the support bar for normally engaging and holding the safety gate in an elevated position, a pivoted tripping arm connected with the latch member at the rear of the support bar, a tripping bumper arranged to move rearwardly upon contact with an object, and means for applying the rearward movement of the tripping bumper to an actuation of the tripping arm whereby to withdraw the latch from engagement with the gate and permit the gate to drop to protective position.

3. In a safety fender construction for automobiles, a support bar extending transversely across the forward extremity of the vehicle, a vertically movable safety gate structure, vertically disposed guide rods carried by the gate structure, bracket members mounted on the support bar in which the guide rods are supported for vertical movement, a latch rod extending through the support bar and movable longitudinally therein, said gate structure being provided with an opening to receive the forward end of the latch rod, a vertically disposed tripping arm pivoted at its lower end on the bracket and connected intermediate its ends to the rearward end of the latch rod, a bumper mounted to slide rearwardly and forwardly on said support bar, and a ratchet member carried by said bumper and arranged to engage the upper end of the tripping arm to withdraw the latch rod and permit the gate to drop to protective position.

4. In a safety fender construction for automobiles, a support bar extending transversely across the forward extremity of the vehicle, a vertically movable safety gate structure mounted for vertical movement on the support bar, a latch rod extending through the support bar and movable longitudinally into and out of latching engagement with the gate structure, spring means tending to force the gate downwardly, a rearwardly movable bumper mounted on the support bar, a latch tripping member, and a connection between the bumper and the latch tripping member for releasing the gate to permit lowering of the same to protective position.

5. In a safety fender construction for automobiles, a support bar extending transversely across the forward extremity of the vehicle, a vertically movable safety gate structure mounted for vertical movement on the support bar, latching means on the support bar for engaging the gate and holding it in an elevated position, a fixed bumper mounted forwardly of the gate structure, a movable bumper slidably mounted on the support bar and arranged to occupy a position forward of the fixed bumper, and latch tripping means arranged to be operated by the movable bumper in the rearward movement thereof.

6. In a safety fender construction for automobiles, a support bar extending transversely across the forward extremity of the vehicle, a vertically movable gate structure mounted for vertical movement on the support bar, ground engaging foot members carried by the gate structure, latching means on the support bar for engaging the gate and holding it in an elevated position, a fixed bumper mounted forwardly of the gate structure, a movable bumper slidably mounted on the support bar and arranged to occupy a position forward of the fixed bumper, a cushioned impact member for the movable bumper, and latch tripping means arranged to be operated by the movable bumper in the rearward movement thereof.

7. In a safety fender construction for automobiles, a support bar extending transversely across the forward extremity of the vehicle, a vertically movable safety gate structure mounted for vertical movement on the support bar, latching means on the support bar for engaging the gate and holding it in an elevated position, a fixed bumper mounted forwardly of the gate structure, a movable bumper mounted on the support bar and arranged to occupy a position forward of the fixed bumper, latch tripping means, a pivoted one-way pawl member carried by the movable bumper and operating to actuate the latching means on the rearward movement of the movable bumper, said movable bumper being adapted to accupy an inoperative position to the rear of the fixed bumper when desired, and said latching means being operable to hold the gate in its elevated position when the movable bumper occupies said inoperative rearward position.

In testimony whereof I affix my signature.

MATTHEW POLJANIC.